United States Patent [19]

Yoshino et al.

[11] Patent Number: 4,691,361

[45] Date of Patent: Sep. 1, 1987

[54] SPEAKER CHANGEOVER DEVICE

[75] Inventors: Yasuhisa Yoshino, Okazaki; Masahiko Osada, Hekinan, both of Japan

[73] Assignee: Nippon Soken, Inc., Nishio, Japan

[21] Appl. No.: 785,852

[22] Filed: Oct. 9, 1985

[30] Foreign Application Priority Data

Oct. 9, 1984 [JP] Japan ................................ 59-212237

[51] Int. Cl.⁴ .............................................. H04B 3/00
[52] U.S. Cl. ..................................... 381/81; 381/86; 381/123
[58] Field of Search ......................... 381/86, 81, 123; 307/10 R

[56] References Cited

U.S. PATENT DOCUMENTS

| | | | |
|---|---|---|---|
| 3,806,820 | 4/1974 | Uchiyama | 381/123 |
| 4,323,787 | 4/1982 | Sato et al. | 307/38 |
| 4,347,510 | 8/1982 | Ishigaki et al. | 381/123 |
| 4,380,809 | 4/1983 | Sato | 307/10 R |
| 4,435,845 | 3/1984 | Timm et al. | 381/123 |
| 4,525,820 | 6/1985 | Enoki et al. | 381/81 |

Primary Examiner—Forester W. Isen
Attorney, Agent, or Firm—Cushman, Darby & Cushman

[57] ABSTRACT

A speaker changeover device has a plurality of audio equipments for outputting ready condition signals when the power source is turned on; a speaker which is used by the audio equipments in common, a changeover control circuit which starts its operation by turning a cycle start switch, cyclically monitors the ready condition signals from the audio equipments simultaneously with the input of clock signals and generates a changeover signal to the audio equipment which first outputs the ready condition signal to stop its operation, and an electromagnetic relay operated by the changeover signal to connect the audio equipment which first outputs the ready condition signal, to the speaker.

7 Claims, 2 Drawing Figures

SPEAKER CHANGEOVER DEVICE

BACKGROUND OF THE INVENTION

1. FIELD OF THE INVENTION

The present invention relates to a speaker changeover device which enables a plurality of audio equipments to use a single speaker in common.

2. DESCRIPTION OF THE PRIOR ART

Recently, audio equipments such as a car radio, a car stereo, a car television and a personal wireless telephone are installed in a vehicle. Each of these audio equipments is provided with a private speaker. This results in the space and the time for installing the private speakers being required and the production cost being increased.

SUMMARY OF THE INVENTION

An object of the present invention is to provide a speaker changeover device which enables a plurality of audio equipments such as a car radio to use a single speaker in common.

The speaker changeover device of the present invention comprises a plurality of audio equipments, each outputting an audio signal, and at least one speaker to which the audio signal is inputted. Each of the audio equipments generates a ready condition signal when the audio signal becomes ready for being outputted. The speaker changeover device of the present invention further comprises a changeover control means for cyclically monitoring the ready condition signal from each of the audio equipments in order, detecting one audio equipment which first generates the ready condition signal in each monitor cycle and generating a changeover signal and a changeover means for connecting the detected audio equipment to one speaker in accordance with the changeover signal.

DETAILED DESCRIPTION OF THE EMBODIMENTS

Figure 1:
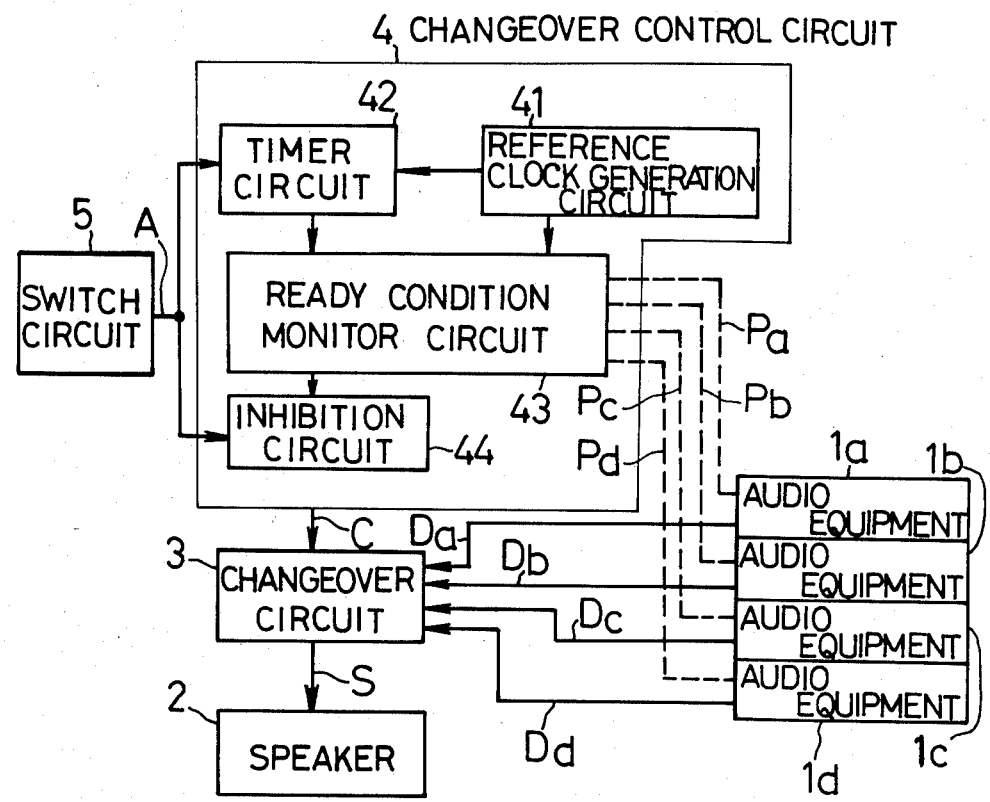
FIG. 1 is a block diagram illustrating the whole structure of a speaker changeover device according to the present invention.

In FIG. 1, the reference numerals 1a, 1b, 1c and 1d denote audio equipments such as a car radio, a car stereo, a car television, and a personal wireless telephone. The reference numeral 2 denotes a stereo speaker 2. The stereo speaker 2 is selectively connected to the audio equipments 1a to 1d by means of a changeover circuit 3 and receives audio signals Da, Db, Dc, and Dd from the audio equipments 1a to 1d as a signal S.

The changeover circuit 3 is operated by a changeover signal C outputted from a changeover control circuit 4. The changeover control circuit 4 is provided with a reference clock generation circuit 41, a timer circuit 42, a ready condition monitor circuit 43 and an inhibition circuit 44.

The ready condition monitor circuit 43 receives ready condition signals Pa, Pb, Pc and Pd from the audio equipments 1a to 1d when electric power is applied thereto. The ready condition monitor circuit 43 cyclically monitors the ready condition signals Pa to Pd in order and generates the changeover signal C for connecting one of the audio equipments 1a to 1d, which first generates the ready condition signal in every monitor cycle, to the speaker 2.

In this embodiment, one monitor cycle is stopped at the time one of the audio equipments is connected to the speaker 2. The next monitor cycle is started upon receiving a cycle start signal A from a switch circuit 5. Namely, by continuously inputting the cycle start signal A for a time longer than that set by the timer circuit 42 (1.5 sec. in this embodiment), the next monitor cycle is started. When the cycle start signal A is inputted for only a short time, the inhibition circuit 44 is operated to inhibit the output of the changeover signal C.

Figure 2:
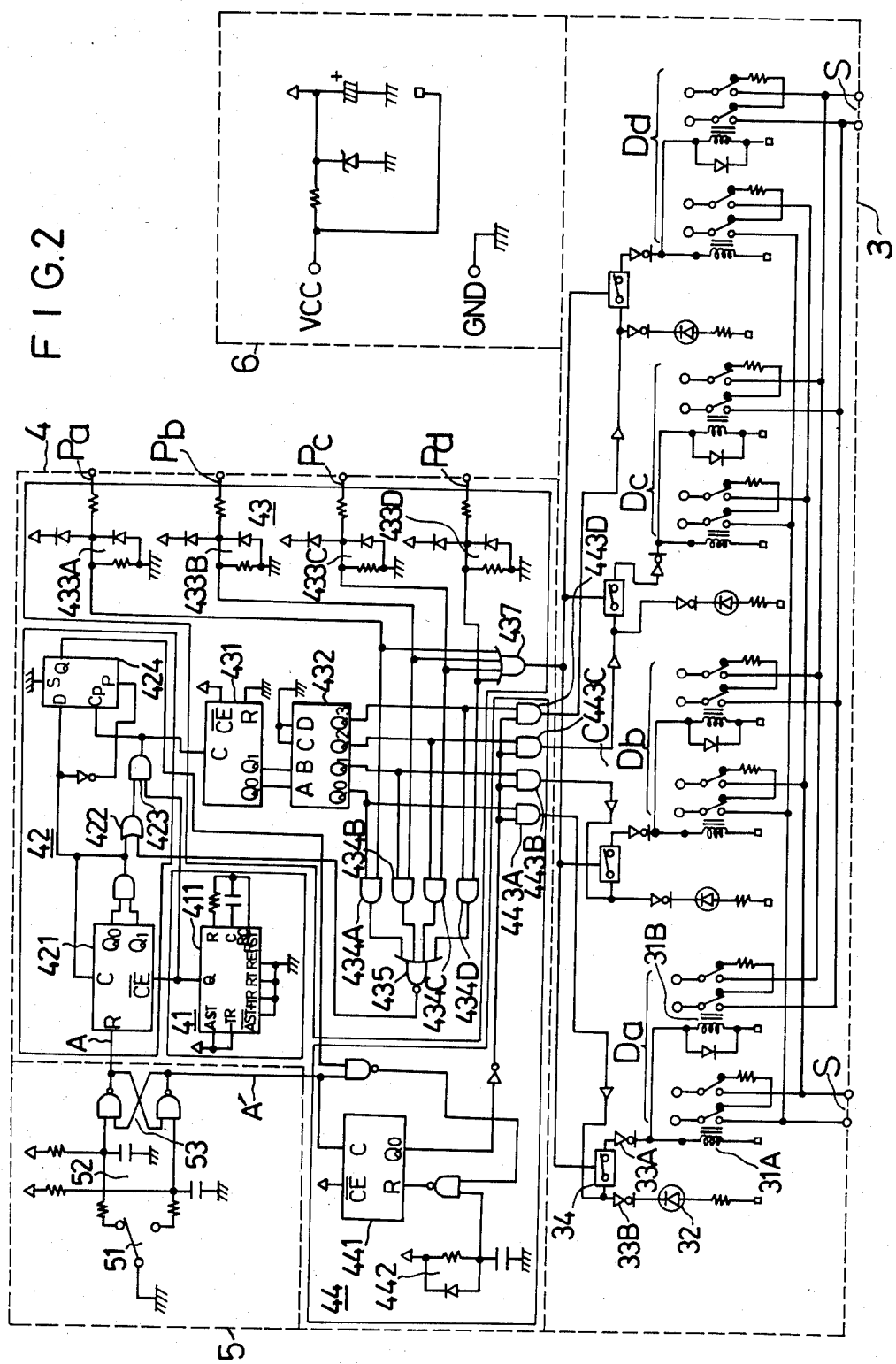
FIG. 2 is a circuit diagram of the speaker changeover device.

FIG. 2 illustrates the details of each circuit. Hereinafter, the structure and the operation of each circuit will be explained with reference to this drawing.

The switch circuit 5 comprises a momentary switch 51, a resistor-capacitor delay circuit 52, and a flip-flop 53 composed of a pair of AND gates. This switch circuit 5 outputs cycle start signals A, A' which are changed to ⌈L⌋ level and ⌈H⌋ level, respectively when the switch 51 is turned on.

The reference clock generation circuit 41 is provided with an astable multi-vibrator 411 and generates reference clocks with a period of about 0.5 sec.

The timer circuit 42 is provided with a binary counter 421. When the signal A inputted to a terminal R of the counter 421 remains ⌈L⌋ level for a time longer than 1.5 sec., both of a terminal $Q_0$ and a terminal $Q_1$ of the counter 421 become ⌈H⌋ level to open an AND gate 423 through an OR gate 422. This results in the reference clocks being outputted to a D type flip-flop 424 and the ready condition monitor circuit 43.

The ready condition monitor circuit 43 is provided with a binary counter 431 to which the reference clocks are inputted and a decoder 432 for decoding the binary output from the counter 431. Outputs from terminals $Q_0$, $Q_1$, $Q_2$ and $Q_3$ of the decoder 432 repeatedly become ⌈H⌋ level in order every time the reference clocks are inputted to the counter 431 to start the monitor cycles.

The ready condition signals Pa to Pd are inputted to AND gates 434A, 434B, 434C and 434D through input protection circuits 433A, 433B, 433C and 433D, each being composed of a resistor and a diode. The AND gates 434A to 434D are selected in order by the outputs of the terminals $Q_0$ to $Q_3$ of the decoder 432. When one of the ready condition signals Pa to Pd becomes ⌈H⌋ level, the corresponding AND gate (out of 434A to 434D) generates an output of ⌈H⌋ level. This results in the output of the NOR gate 435 becoming ⌈L⌋ level to close the AND gate 423 through the OR gate 422. Thus, the monitor cycle is stopped.

When the monitor cycle is stopped, the outputs of the terminals $Q_0$ to $Q_3$ of the decoder 432, one of which is at H level are fed to the changeover circuit 3 as the changeover signals C by way of AND gates 443A, 443B, 443C and 443D of the inhibition circuit 44.

The ready condition signals Pa to Pd are also fed to the changeover circuit 3 by way of the OR gate 437.

The changeover circuit 3 is provided with four systems of changeover channels, each corresponding to each of the audio signals Da to Dd fed from the audio equipments 1a to 1d. Each changeover channel is composed of a pair of two contact relays 31A and 31B, a light emission diode 32, drivers 33A and 33B and an analog switch 34 operated by the output of the OR gate 437.

In the changeover channel selected by the changeover signal C, the relays 31A and 31B are operated and the light emission diode 32 is lighted. This results in one of the audio signals Da to Dd being selected to be fed to the stereo speaker 2 (FIG. 1) as a signal S.

When none of the ready condition signals Pa to Pd is inputted, the monitor cycle is repeated. In this case, the output of the OR gate 437 is at ⌜L⌟ level, so no analog switch 34 is operated. Only the light emission diodes 32 are lighted in order.

The inhibition circuit 44 is provided with a binary counter 441 and a power-up reset circuit 442. The output of a terminal $Q_0$ of the counter 441 is inverted every time the switch 51 is turned on for a short time to input the cycle start signal A' thereto. This results in the AND gates 443A to 443D being opened or closed.

The counter 441 is reset when the flip-flop 424 of the timer circuit 42 is set at the monitor cycle start time to open the gates 443A to 443D.

The reference numeral 6 denotes a circuit for supplying electricity to the circuits 3, 4 and 5 and this circuit starts its operation when a key switch (not shown) is located at its accessory (ACC) position.

In operation, when no power is applied to the audio equipments 1a to 1d, the output of the terminals $Q_0$ to $Q_3$ of the decoder 432 becomes ⌜H⌟ level in order every time the clock signal is inputted to repeat the monitor cycle.

When power is applied to one of the audio equipments and one of the ready condition signals Pa to Pd is generated, the ready condition monitor circuit 43 detects the generated ready condition signal to stop the monitor cycle and connect the power-applied audio equipment to the speaker 2.

When the speaker 2 is changed over to be connected to another audio equipment which is ready for operation, the switch 51 is continuously turned on for a time longer than 1.5 sec. This results in the monitor cycle being started again and the above described another audio equipment is connected to the speaker 2.

While the switch 51 continues to be turned on, the monitor cycle is forcibly repeated.

The connection between the selected audio equipment and the speaker 2 can be temporarily interrupted by turning on the switch 51 for a short time. This results in the terminal $Q_0$ of the flip-flop 441 being inverted to close the gates 443A to 443B and place the relays 31A and 31B of each channel in nonexciting condition.

The selected audio equipment can be connected again to the speaker 2 by turning on the switch 51 again for a short time.

In the above embodiment, a pair of changeover relays 31A and 31B are provided in every changeover channel so as to feed stereo audio signals from the audio equipments 1a to 1d to the left and right stereo speakers 2. Instead, one audio equipment can be connected to one of the left and right stereo speakers 2 by way of the changeover relay 31A while another audio equipment can be connected to the other speaker 2 by way of the changeover relay 31B. By adopting this structure, two audio equipments, a car radio and a car stereo for example, can be listened at the same time.

Furthermore, by using solid state relays as the changeover relays 31A and 31B, the whole circuit can be made into a compact hybrid IC.

As described above, the speaker changeover device of the present invention comprises a plurality of audio equipments and at least one speaker to which signals from the plurality of audio equipments are inputted. The speaker changeover device cyclically monitors the ready condition of each of the plurality of audio equipments and connects one audio equipment which first becomes ready for operation in each monitor cycle to one of the at least one speaker. Each speaker can be used by a plurality of audio equipments in common.

By installing the speaker changeover device of the present invention in a vehicle, a plurality of audio equiments such as a car radio, a car stereo and a personal wireless telephone can use one speaker in common. Therefore, a large space for installing speakers and the time for wiring are not required and the production cost becomes very inexpensive.

What is claimed is:

1. A speaker changeover device comprising:
   a plurality of audio equipments, each outputting an audio signal, each of said plurality of audio equipments generating a ready condition signal at the time when a power source switch of each of said plurality of audio equipments is turned on;
   at least one speaker to which the audio signal is inputted;
   a cycle start switch;
   a changeover control means for cyclically monitoring the ready condition signal from each of said plurality of audio equipments in order, for detecting one audio equipment which first generates the ready condition signal in each monitor cycle and for generating a changeover signal, said changeover control means stopping the monitor cycle at the time when the changeover signal is outputted, and restarting the monitor cycle at the time when said cycle start switch is turned on; and
   a changeover means for connecting said one audio equipment which first generates the ready condition, signal, to one of said at least one speaker in accordance with the changeover signal.

2. A speaker changeover device according to claim 1, wherein said plurality of audio equipments are composed of a car radio, a car stereo, a car television and a personal wireless telephone, respectively.

3. A speaker changeover device according to claim 1, wherein said changeover control means comprises:
   clock pulse generating means for generating clock pulses;
   a decoder having output ports of the same number with that of said audio equipments, each one of output signals from said output ports cyclically becoming ⌜H⌟ level in order, upon said decoder receiving said clock pulses;
   a plurality of gates for receiving, respectively, the ready condition signal from said plurality of audio equipments wherein the cyclical output signals of ⌜H⌟ level from said decoder select one of said plurality of gates for outputting the respective said ready condition signal; and
   an inhibiting gate which closes and inhibits said clock pulses into said decoder to stop the monitor cycle when the ready condition signal is outputted from the selected gate;
   said changeover control means outputting an output signal of ⌜H⌟ level as a changeover signal when the monitor cycle is stopped and said inhibiting gate being opened when said cycle start switch is turned on.

4. A speaker changeover device according to claim 3, wherein said changeover control means is provided with a timer circuit connected to said cycle start switch; said timer circuit generates a signal for opening said inhibition gate when said cycle start switch is continuously turned on for a predetermined period of time.

5. A speaker changeover device according to claim 4, wherein said changeover control means is provided with a flip-flop of which the output is inverted every time when said cycle start switch is turned on, and a gate which opens and closes in response to the output of said flip-flop to control the passing of the changeover signal.

6. A speaker changeover device according to claim 1, wherein said changeover means is composed of a plurality of electromagnetic relays of which the number is the same with that of said audio equipments, one terminal of each of said plurality of electromagnetic relays is connected to the corresponding one of said audio equipments and the other terminal of each of said plurality of electromagnetic relays is connected to one of said at least one speaker in common; and said electromagnetic relays are selectively operated by the changeover signal.

7. A speaker changeover device according to claim 6, wherein said at least one speaker is a stereo speaker composed of a pair of speakers; each of said electromagnetic relays is provided with a pair of relay contacts; one terminal of each relay contact is connected to corresponding one of said audio equipments and the other terminal of each relay contact is connected to each of said pair of speakers.

* * * * *